US007145652B2

(12) United States Patent
Moehler et al.

(10) Patent No.: US 7,145,652 B2
(45) Date of Patent: Dec. 5, 2006

(54) MICROSCOPE WITH POSITION DETECTION OF CHANGERS OF OPTICAL COMPONENTS

(75) Inventors: Gunter Moehler, Jena (DE); Ralf Wolleschensky, Schoeten (DE); Mirko Liedtke, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 10/419,016

(22) Filed: Apr. 17, 2003

(65) Prior Publication Data
US 2003/0231384 A1 Dec. 18, 2003

(30) Foreign Application Priority Data
Apr. 17, 2002 (DE) .................. 102 17 545

(51) Int. Cl.
*G01N 15/02* (2006.01)
*G02B 21/00* (2006.01)
*G01J 3/28* (2006.01)
(52) U.S. Cl. .................. 356/336; 356/326; 359/385; 359/368
(58) Field of Classification Search ........ 359/368–390, 359/885–892; 356/318–336
See application file for complete search history.

(56) References Cited
U.S. PATENT DOCUMENTS

| 3,724,951 | A | * | 4/1973 | Seelbinder | .................. | 356/336 |
| 4,176,963 | A | * | 12/1979 | Fabinski et al. | ............ | 356/418 |
| 4,396,288 | A | * | 8/1983 | Helphrey | .................... | 356/326 |
| 4,713,683 | A | * | 12/1987 | Fujimori et al. | ............ | 348/269 |
| 4,943,142 | A | * | 7/1990 | Fay et al. | .................... | 359/889 |
| 5,127,730 | A | * | 7/1992 | Brelje et al. | ................ | 356/318 |
| 5,185,641 | A | * | 2/1993 | Igushi et al. | ................ | 356/336 |
| 5,633,752 | A | * | 5/1997 | Tsuchiya et al. | ............ | 359/390 |
| 5,926,773 | A | | 7/1999 | Wagner | ....................... | 702/22 |
| 6,167,173 | A | | 12/2000 | Schoeppe et al. | ............. | 385/33 |
| 6,403,332 | B1 | * | 6/2002 | Bearman et al. | ............. | 435/29 |
| 2001/0038452 | A1 | | 11/2001 | Beaumont | ................... | 356/416 |

FOREIGN PATENT DOCUMENTS

| DE | 197 02 753 | 7/1998 |
| DE | 198 29 944 | 1/2000 |
| EP | 0 638 788 A1 | 2/1995 |
| WO | WO 0019262 | 4/2000 |

* cited by examiner

Primary Examiner—Thong Nguyen
(74) Attorney, Agent, or Firm—Reed Smith LLP

(57) ABSTRACT

A microscope with optical components which are provided in the illumination beam path and/or observation beam path and/or detection beam path for exerting different spectral influences on at least one of the beam paths mentioned above. An arrangement comprising a light source emitting a plurality of wavelengths and at least one spectral sensor detecting the light of this light source after interacting with a component are provided, preferably outside these beam paths. The interaction is carried out by transmission or reflection of the light by the component. The detected values of the spectral sensor are compared to pre-stored values and correlation with pre-stored values is advantageously carried out in a storage. The correlation is carried out together with a position signal of a component changer. The detected values are stored separately and together with a position signal of a component changer when there is no correlation with pre-stored values.

32 Claims, 7 Drawing Sheets

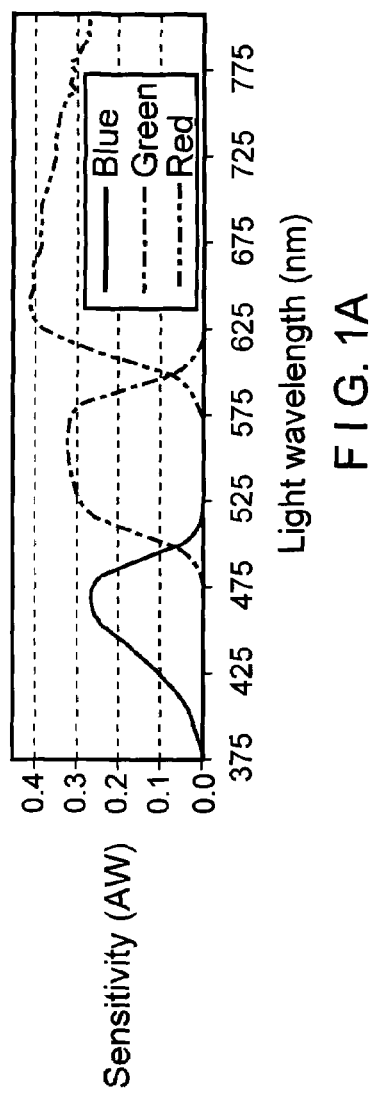
F I G. 1A
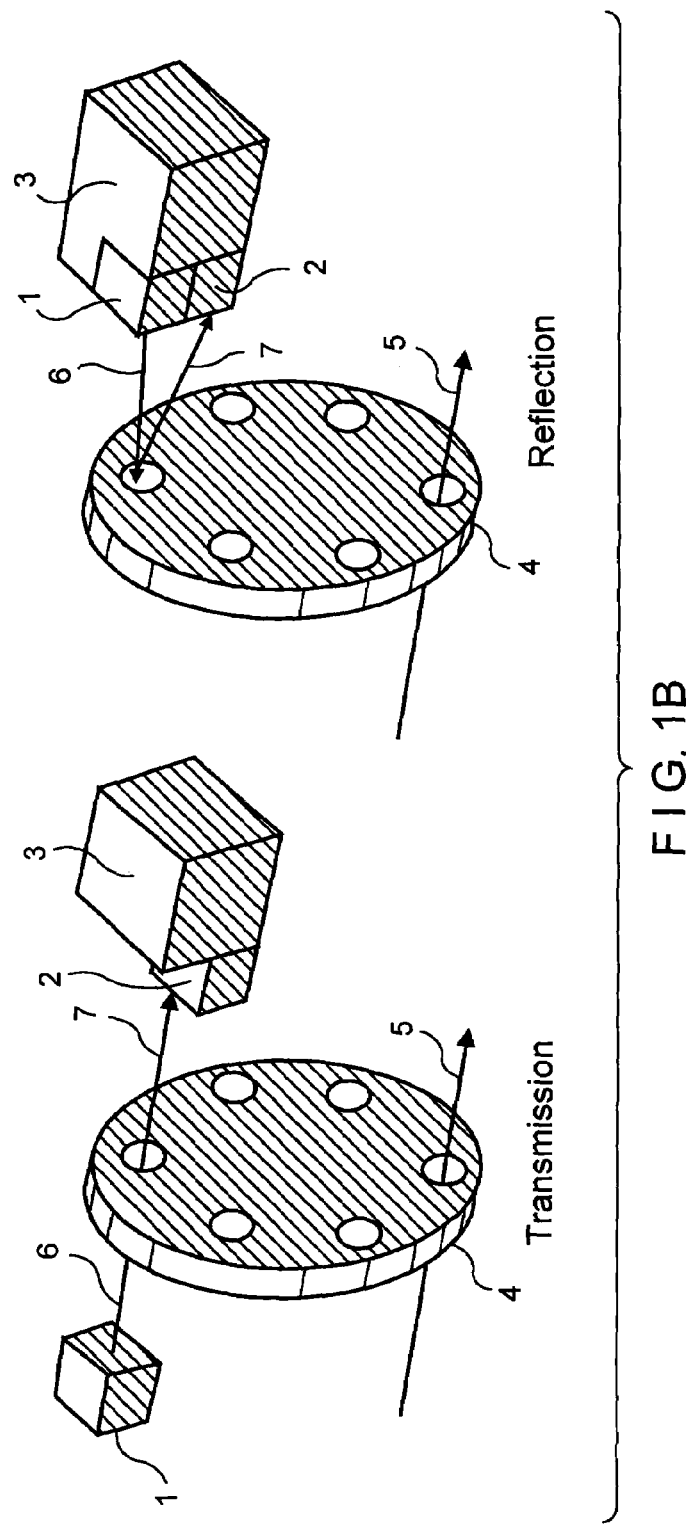
F I G. 1B

| Filter | Red | Green | Blue |
|---|---|---|---|
| BP505-10° | 2.4878 | 51.02439 | 1.66463 |
| BP505-21° | 2.81308 | 27.17757 | 1.25234 |
| BP505-530 | 5.62139 | 68.00289 | 2.38439 |
| BP505-530neu | 3.17925 | 66.67925 | 1.87736 |
| BP505-530-10° | 1.69162 | 49.05389 | 1.47305 |
| BP505-530.21° | 3.85612 | 26.35971 | 1.32374 |
| BP505-550 | 12.90385 | 161.1346 | 5.49038 |
| BP505-550-10° | 7.78986 | 129.3696 | 3.97826 |
| BP505-550-21° | 8.85294 | 69.08824 | 2.9902 |
| BP585-615 | 47.87259 | 29.0695 | 4.04247 |
| BP585-615-10° | 31.31694 | 23.86339 | 3.03825 |
| BP585-615-21° | 23.23585 | 13.83019 | 2.62264 |
| LP475 | 255 | 255 | 62.6609 |
| LP585 | 255 | 33.76987 | 11 |
| LP585-10° | 255 | 27.49261 | 8,9803 |
| LP585-21° | 154.1544 | 16.48529 | 5.98529 |
| LP505 | 255 | 255 | 16.05263 |
| LP505-10° | 255 | 255 | 17.99206 |
| LP505-21° | 160.0333 | 159.7583 | 11.18333 |
| LP530 | 255 | 255 | 17.99752 |
| LP530-10° | 255 | 244.6781 | 16.2103 |
| LP650 | 125.9963 | 3.47212 | 3.82528 |
SEE FIG. 4B
F I G. 4A

PRIOR ART

HT: Main beam splitter; NT: Beam splitter; EF: Emission filter; AF: Attenuation filter

US 7,145,652 B2

MICROSCOPE WITH POSITION DETECTION OF CHANGERS OF OPTICAL COMPONENTS

CROSS-REFERENCE TO RELATED APPLICATIONS

This application claims priority of German Application No. 102 17 545.4, filed Apr. 17, 2002, the complete disclosure of which is hereby incorporated by reference.

BACKGROUND OF THE INVENTION

In filter turrets, slides and the like components of a microscope, a position sensor is usually used to detect a zero position as a reference from which all further positions are calculated and approached. The identification of the filters being used is displayed to the user by tables or codes. An effective measurement and detection in the outfitted state can only be carried out via filters that are identified in a correspondingly standardized manner (e.g., bar codes, binary-coded magnet arrangements and the like). However, since the filters are obtained from different manufacturers, the identification or marking can also be read differently and not by one method.

Further, incorrect outfitting can never be completely excluded and a subsequent outfitting requires manual correction of the database or truth table.

SUMMARY OF THE INVENTION

A microscope with optical components which are provided in the illumination path and/or observation beam path and/or detection beam path for exerting different spectral influences on at least one of said beam paths having an arrangement comprising a light source emitting a plurality of wavelengths and at least one spectral sensor detecting the light of this light source after interacting with an optical component are provided, preferably outside these beam paths.

A spectral sensor and a white LED are used as position sensor. This sensor is capable of determining the optimal position (maximum passage) of a position and also ascertaining the characteristic of a filter by means of spectral measurement. A reliable determination of the utilized filter is possible by means of comparison with a database. Further, a tilting of the filter in the beam path can be monitored.

Moreover, it is possible to determine the active laser, the laser wavelength and the emitted output when using the color sensor instead of a monitor diode and to link these values with any existing combinations of excitation and detection filters.

The invention will be described more fully in the following with reference to the schematic drawings.

BRIEF DESCRIPTION OF THE DRAWINGS

In the drawings:

FIG. 1a graphically illustrates the wavelength-dependent sensitivity of a kind of sensor;

FIG. 1b shows, pictorially, how a turret containing color filters or a plurality of dichroic splitters is penetrated by a microscope beam path;

DESCRIPTION OF THE INVENTION

Figure 1:
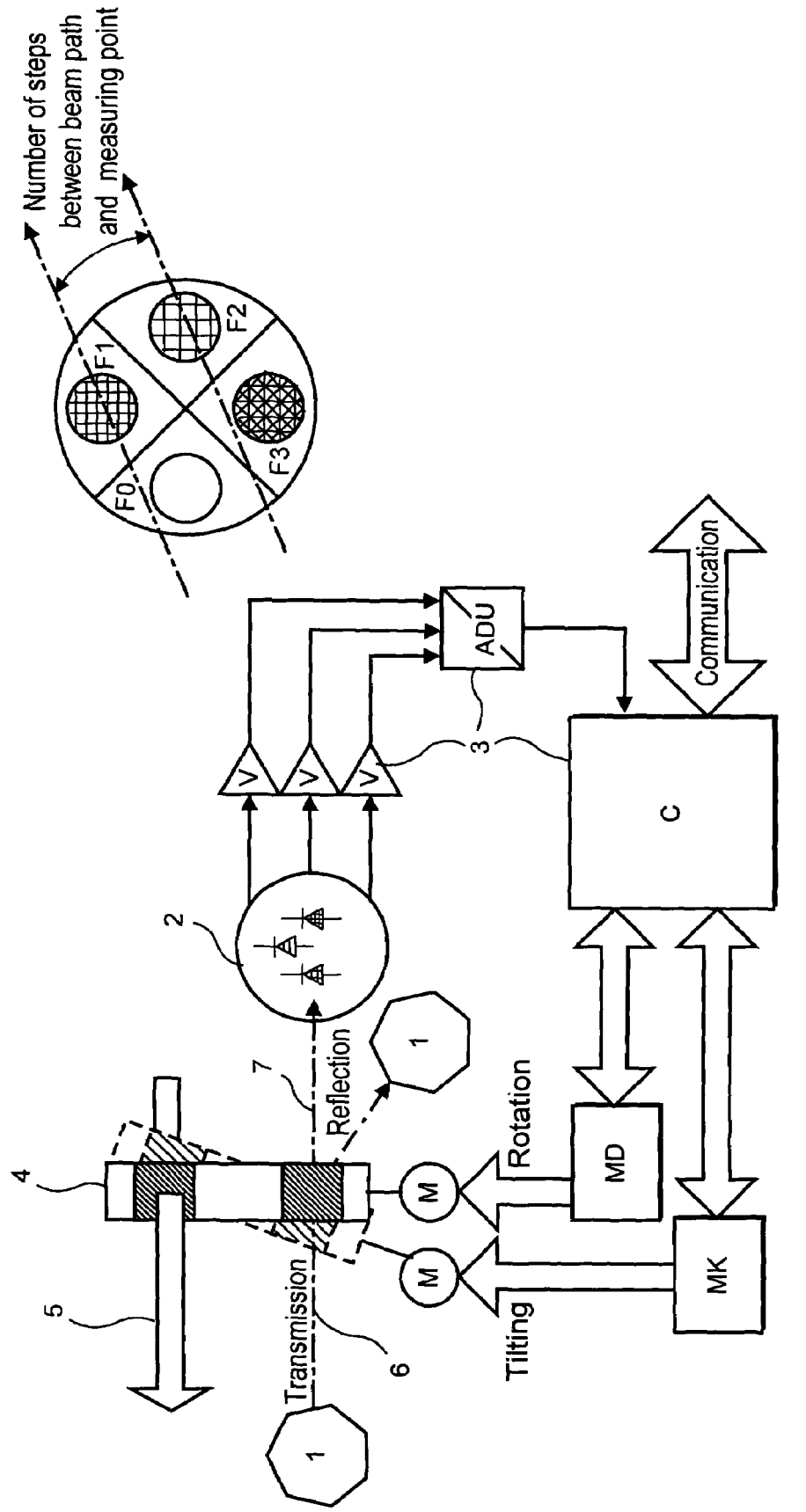
FIG. 1 shows the basic construction for the optical component detection and positioning.

It is shown schematically in FIG. 1 and also in FIG. 1b how a turret 4 containing color filters or a plurality of dichoric spitters, for example, is penetrated by a microscope beam path 5 (illumination beam path or detection beam path). Reference numerals F0, F1, F2, and F3 illustrate the different filters of beam splitters in the turret 4.

Turrets of this type using different light sources, particularly in fluorescence microscopes, are known (DE 19702753 A1, DE 19829944 A1), wherein a plurality of turrets with different filters or beam splitters can be exchanged manually or automatically. Further, a second beam path 6 (transmitting part)/7 (receiving part) is provided outside of the microscope beam path which is generated by a stationary white light source 1 (diode) and is arranged at left in FIG. 1b in such a way that the filters or beam splitters are penetrated by it during rotation of the turret in transmission.

The irradiation of dichroic beams splitters and the measurement of the characteristic of the reflected light is shown in FIG. 1b. According to the invention, a stationary color sensor 2 for spectral analysis of the transmitted light is provided on the side of the turret 4 located opposite to the light source 1. This sensor 2 is fastened to a printed circuit board 3 and is connected via an amplifier V and an A/D converter ADU to a control and computing unit C which is also connected to control elements MD for rotating the turret and, also of the microscope that diverges slightly from the vertical. The motors M are utilized for the rotations and tilting if the turret 4 via the controls MD and MK.

The sensor 2 can advantageously be a simple, small "three-element" color sensor (Mazet, www.mazet.de) comprising three photodiodes which are integrated on a chip and sensitized by means of color filters for another color range, preferably for the primary colors red, green and blue.

The wavelength-dependent sensitivity of a sensor of this kind is shown in FIG. 1a. However, other color sensors such as the miniaturized spectral sensors by Zeiss (www.zeiss.de) are also suitable in principle.

Figure 2:
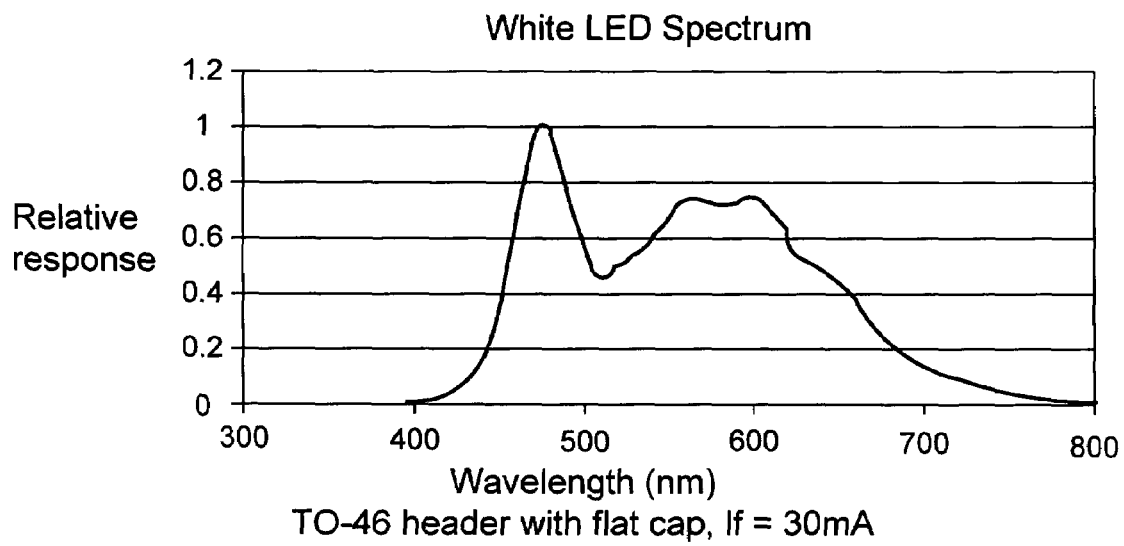
FIG. 2 shows, in graphical form, the spectral distribution of a white light LED.
Figure 3:
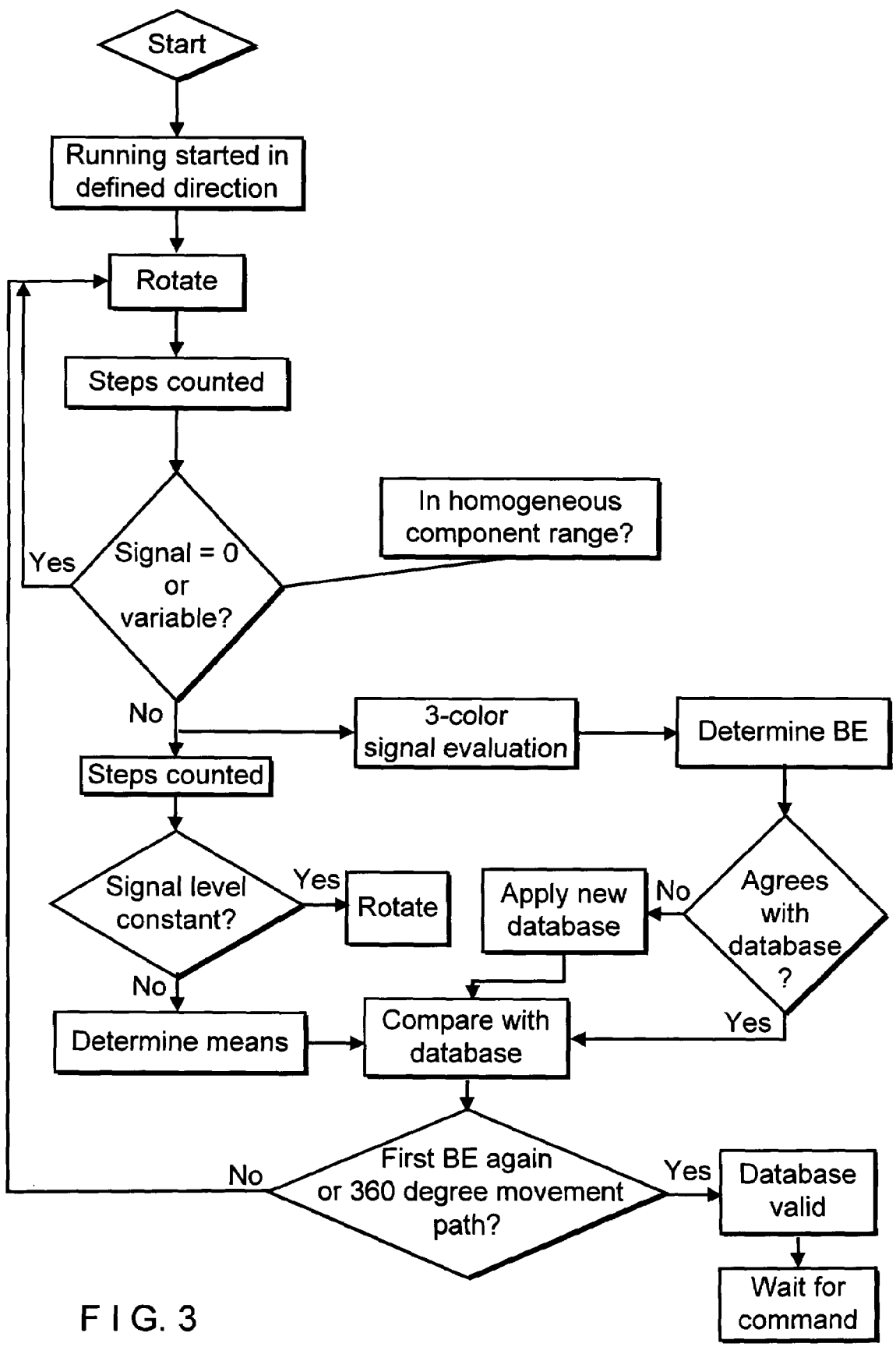
FIG. 3 shows, in flow form, a possible advantageous logical sequence for determining the filter type and position.

FIG. 2 shows the spectral distribution of a white light LED. FIG. 3 shows a possible advantageous logical sequence for determining the filter type and position.

After a start sign, the turret 4 begins to rotate, the rotary drive being carried out by means of stepper motors whose steps are counted or by a DC motor with incremental transducer, so that there is a unique correlation with a turret position in the control unit C. The (geometric) center of the first detected component (filter), for example, can be set as the zero position.

The entire process of detecting the outfitting of filters or beam splitters can be carried out and concluded within seconds, that is, very quickly (steps in the ms range are possible by means of stepper motors).

As soon as the signal of the color sensor 2 deviates significantly from zero, i.e., a through-position is achieved for the light 1 in the turret 4, a color evaluation is carried out in the color sensor and the spectrally dependent intensity is determined. This is compared, after A/D conversion in the computer, to color values based on tables that are stored beforehand in a database, which color values correspond to those filters used in the microscope, and when there is a match a stored filter designation is allocated to the respective turret position. If there is no match with the values in the database, a new database is applied or a filter type "X" is assigned to the existing database and can be displayed to the user and can contain a user-specific name. This is a great advantage because in this way the user of the microscope can use filters and filter wheels from other manufacturers reversibly and without difficulty because the system can mark the filter position and the assigned filter name by way of the database. While this determination of filter type takes place in the computer, the point on the respective filter for optimal transmission is determined and stored simultaneously by incremental further rotation also by evaluating the respective color intensity and, for example, forming or adding centers of gravity, so that the optimum position can also still be adjusted simultaneously when this filter is used.

However, this determination can also be updated each time the filter turret is loaded, so that possible scratches or aging processes no longer exert a negative influence on the previous optimal position in that a new optimal position is found.

Further, a change (and optimizing) of the transmission characteristic at a determined filter location, e.g., in the previously determined optimum position, can be carried out by means of a slight tilting of the turret toward the optical axis and can be stored together with the stepper motor position of the tilting control.

Figure 4B:
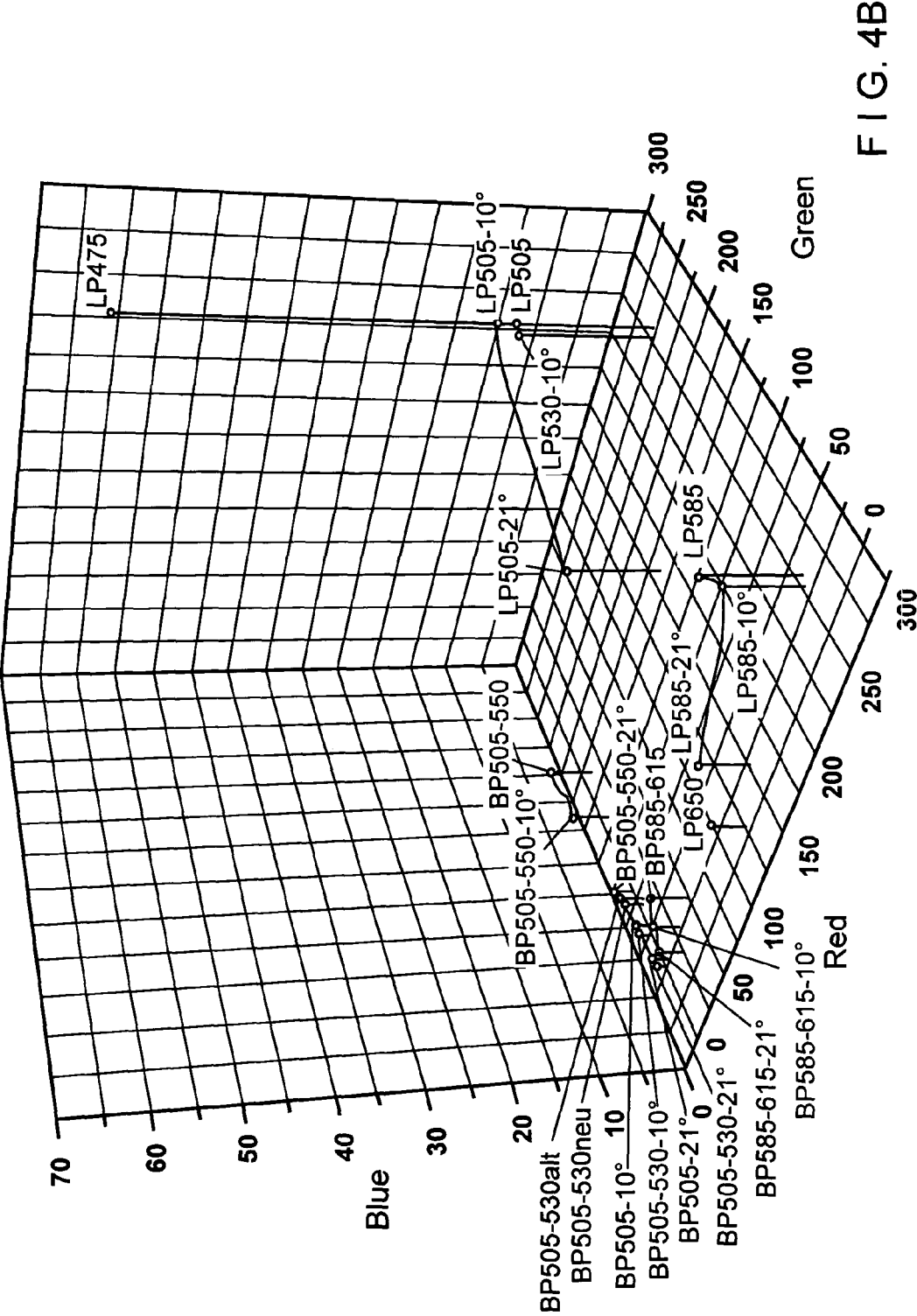
FIG. 4 shows averaged measurements for typical filters and different tilting and a three dimensional graph.

FIG. 4 shows averaged measurements for typical filters and different tilting and a three-dimensional graph. In this case, it is shown in tabular form and with reference to a histogram that different filter types differ with respect to their spectral characteristics such that the measurement values can be uniquely correlated with the type of component already by a simple three-color sensor.

Figure 5:
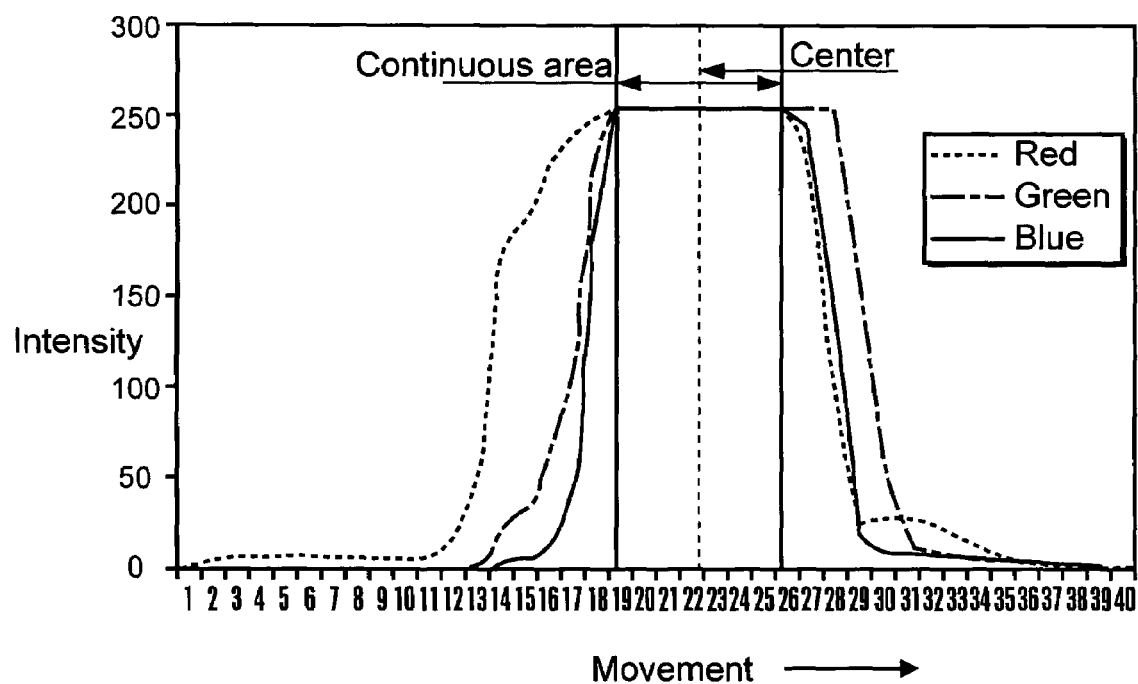
FIG. 5 shows an intensity curve in the passage of a turret.

FIG. 5 shows an intensity curve in the passage of a turret (not outfitted in this case). It can be seen that the beginning and end of a filter passage (not outfitted in this case) can easily be identified (continuous area). The counted steps of the stepper motor are shown by way of example on the abscissa.

Figure 6:
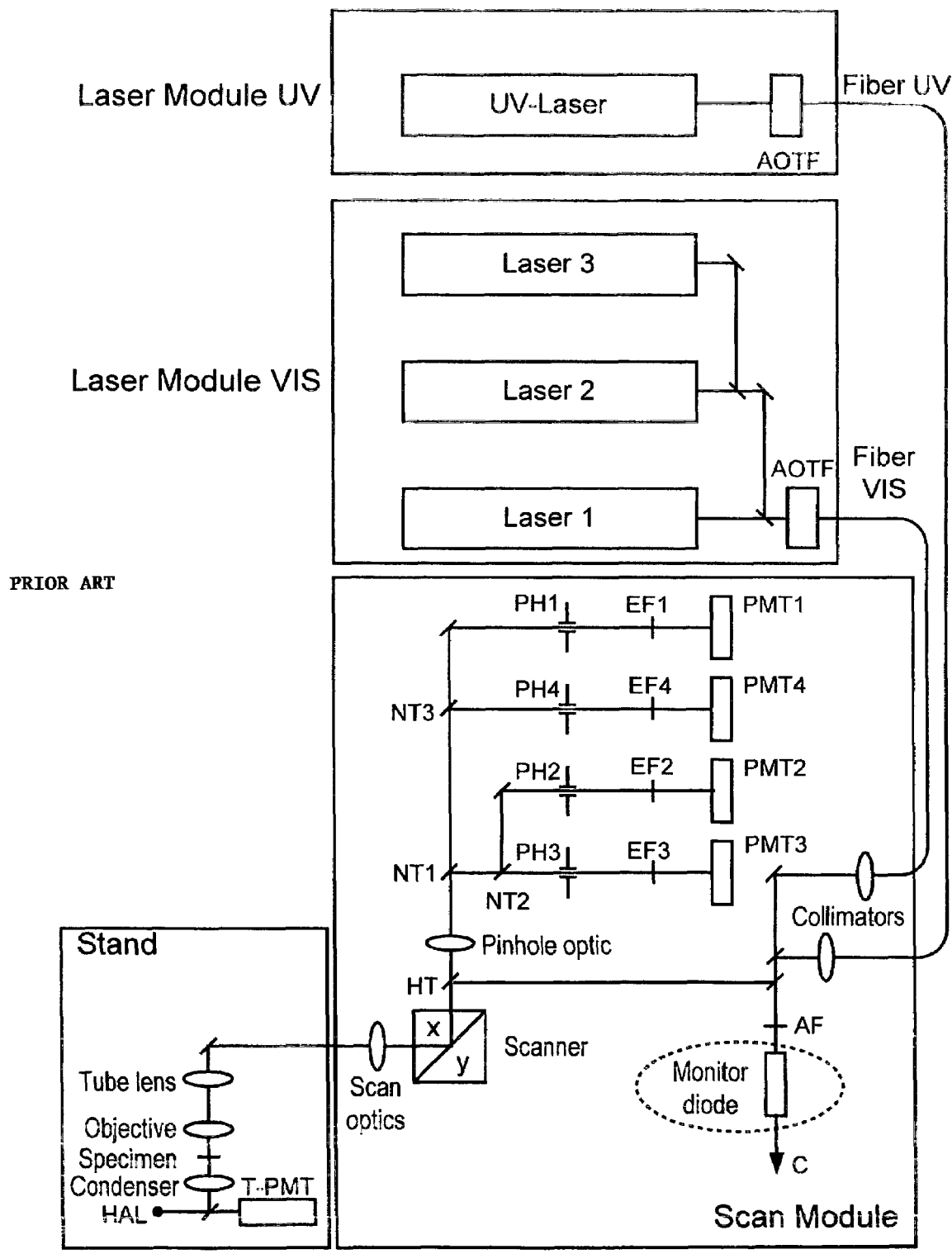
FIG. 6 shows the basic design of a laser monitoring arrangement.

FIG. 6 shows the basic design of a laser monitoring arrangement (monitor diode). The laser monitoring arrangement may include an Acousto optical tuneable filter (AOTF), photo multiplier tubes (PMT1-PMT4), a halogen lamp (HAL) and a transmission photomultiplier tube (T-PMT). Reference is had to DE 19702753 and U.S. Pat. No. 6,167,173 (for example) for descriptions. Monitor diodes for laser monitoring in an LSM are known from these references. However, the detection of the radiated laser beam with a color sensor which detects the utilized wavelength (in addition to the intensity) is novel and particularly advantageous. When a new laser is radiated into the system, an excitation/detection/filter combination matching the radiated wavelength can be adjusted (See U.S. Pat. No. 6,300, 639).

The invention can be advantageously applied in different types of microscope, particularly in research microscopes such as fluorescence microscopes, laser scanning microscopes (LSM), particularly for investigating fluorescence, in FCS (fluorescence correlation spectroscopy) arrangements, combined FCS/LSM and for determining spectral signatures according to the ZEISS Meta System.

The following particular advantages of the invention are particularly noteworthy:

Fully automatic type determination of the outfitting of movable optical components (e.g., in turrets, slides, etc. for filters, reflectors, beam splitters, objectives and the like) through spectral characterization;

Optimum positioning of at least one optical component in the beam path;

No (interfering) arrangement of light source and sensor in the beam path of the microscope;

Signal picked up by means of three color sensors and white light source, evaluation and table management by means of ADU and microcontroller;

No need for a mechanical or binary-coded (or other kind of) lock;

No need for coding of the optical components;

Erroneous outfitting of component carrier (turret, slide, etc.) no longer possible;

Manual database comparison after changing components no longer needed;

Automatic setup possible;

Use of large variety of optical components easily possible;

Use of large variety of turrets (carriers/number of positions) easily possible;

Dynamic positioning of components possible, i.e., no absolute positions needed;

Selection of components with type designation possible;

Self-calibration of the turret is possible independent from the system;

Continuous calibration monitoring during progress of operation;

Simplified, faster production and/or assembly;

Error-tolerant production and/or assembly;

Detection of contamination of the component;

Detection of thermal tolerances and/or changes in the component;

Detection of inhomogeneities of the component (specifically filter);

Detection of manufacturing variations in the component;

Precise variation of the filter characteristics by inclining the filter axis;

Monitoring the filter characteristics when inclining the filter axis.

When using the three-color sensor in the beam path as monitor diode:

Monitoring and/or checking/sensor for adjusting the excitation wavelengths;

Monitoring the laser output;

Detection of mixing light and/or sources of interference;

Matching of optical characteristics of the microscope;

Monitoring of the optical characteristics of the microscope.

While the foregoing description and drawings represent the present invention, it will be obvious to those skilled in the art that various changes may be made therein without departing from the true spirit and scope of the present invention.

What is claimed is:

1. A microscope with optical components which are provided in at least one of an illumination beam path, an observation beam path and a detection beam path for exerting different spectral influences on at least one of said beam paths, an arrangement therein comprising:

a light source emitting a plurality of wavelengths; and at least one spectral sensor detecting the light of said light source after interacting with one of said optical components, whereby the light source and the spectral sensor are outside of these beam paths, wherein an output of the at least one spectral sensor provides spectral characterizations of said optical component.

2. The microscope according to claim 1, wherein the interaction is carried out through the transmission of light through the component.

3. The microscope according to claim 1, wherein the interaction is carried out through reflection of the light at the component.

4. The microscope according to claim 1, wherein the component is an optical filter.

5. The microscope according to claim 1, wherein the optical components are filters and are arranged in an adjustable filter turret.

6. The microscope according to claim 5, wherein the filter turret is exchangeable.

7. The microscope according to claim 1, wherein the component is a dichroic splitter.

8. The microscope according to claim 7, wherein the optical components are splitters and are arranged in a changer.

9. The microscope according to claim 8, wherein the changer is exchangeable.

10. The microscope according to claim 1, wherein a spectral sensor is provided for detecting spectral characteristics of the illumination light.

11. The microscope according to claim 10, wherein the illumination light is at least one laser.

12. The microscope according to claim 1, wherein the microscope contains at least one of a laser scanning microscope and a fluorescent correlation spectroscope arrangement.

13. The microscope according to claim 1, wherein additional components for spectral influencing are correlated based on a determined illumination wavelength.

14. A method for controlling a microscope with components which are provided in at least one of an illumination beam path, an observation beam path and a detection beam path for exerting different spectral influences on at least one of said beam paths comprising the steps of:
    detecting an interaction between a light source and one of said optical components by a spectral sensor wherein the light source and the spectral sensor are outside of these beam paths;
    providing spectral characterization of the optical component; and
    storing the detected interaction.

15. The method according to claim 14, wherein the interaction is carried out by the transmission of the light through the component.

16. The method according to claim 15, wherein the component is an optical filter.

17. The method according to claim 16, wherein the optical components are filters and are arranged in a filter turret.

18. The method according to claim 17, wherein the filter turret is exchangeable.

19. The method according to claim 14, wherein the interaction is carried out through reflection of the light at the component.

20. The method according to claim 19, wherein the component is a dichroic splitter.

21. The method according to claim 20, wherein the optical components are splitters and are arranged in a changer.

22. The method according to claim 21, wherein the changer is exchangeable.

23. The method according to claim 14, wherein the detected values of the spectral sensor are compared to pre-stored values and correlation with pre-stored values is carried out in a storage.

24. The method according to claim 23, wherein the correlation is carried out together with a position signal of a component changer.

25. The method according to claim 14, wherein the detected values are stored separately and together with a position signal of a component changer when there is no correlation with pre-stored values.

26. The method according to claim 14, wherein a detection of spectral characteristics of the illumination light is carried out by means of a spectral sensor.

27. The method according to claim 26, wherein the illumination light is at least one laser.

28. The method according to claim 27, wherein the microscope contains at least one of a laser scanning microscope and a fluorescent correlation spectroscope arrangement.

29. The method according to claim 27, wherein additional components for spectral influencing are correlated based on determined illumination wavelengths.

30. The method according to claim 26, wherein the microscope contains at least one of a laser scanning microscope and a fluorescent correlation spectroscope arrangement.

31. The method according to claim 26, wherein additional components for spectral influencing are correlated based on determined illumination wavelengths.

32. The method according to claim 14, wherein the point of maximum or optimum transmission or reflection is determined by the spectral sensor on a component and is stored with a spatial position.

* * * * *